(12) United States Patent
Yamane et al.

(10) Patent No.: US 11,185,398 B2
(45) Date of Patent: Nov. 30, 2021

(54) INTERDENTAL BRUSH

(71) Applicant: MEILLEUR CO., LTD., Funabashi (JP)

(72) Inventors: Tsurashi Yamane, Funabashi (JP); Kaori Nakagawa, Funabashi (JP); Junko Ochibe, Funabashi (JP)

(73) Assignee: Meilleur Co. Ltd, Funabashi (JP)

( * ) Notice: Subject to any disclaimer, the term of this patent is extended or adjusted under 35 U.S.C. 154(b) by 0 days.

(21) Appl. No.: 17/058,524

(22) PCT Filed: Apr. 14, 2020

(86) PCT No.: PCT/JP2020/016451
§ 371 (c)(1),
(2) Date: Nov. 24, 2020

(65) Prior Publication Data
US 2021/0315672 A1   Oct. 14, 2021

(51) Int. Cl.
*A61C 15/00* (2006.01)
*A46B 9/10* (2006.01)

(52) U.S. Cl.
CPC ............. *A61C 15/00* (2013.01); *A46B 9/10* (2013.01); *A46B 2200/108* (2013.01)

(58) Field of Classification Search
CPC ............ A46B 15/0069; A46B 15/0071; A46B 15/0073; A46B 15/0087; A46B 15/0095;
(Continued)

(56) References Cited

U.S. PATENT DOCUMENTS 5,718,667 A * 2/1998 Sugimoto .......... A61C 17/3481
601/139
6,247,477 B1 * 6/2001 Wagner .................. A45D 44/18
132/309
(Continued)

FOREIGN PATENT DOCUMENTS

CN            2426304 Y        4/2001
CN         203388462 U        1/2014
(Continued)

OTHER PUBLICATIONS

May 4, 2021 Extended Search Report issued in European Patent Application No. 20793232.8.
(Continued)

*Primary Examiner* — Rachel R Steitz
*Assistant Examiner* — Karim Asqiriba
(74) *Attorney, Agent, or Firm* — Oliff PLC (57) ABSTRACT

An interdental brush realizing reuse of parts by a simple structure includes a shaft portion including an internal passage which extends in an axial direction and of which distal end and base end are opened; and a brush on which fibers are implanted over an entire area of a core that is longer than extension length of the internal passage. The shaft portion further includes a grip portion of which a state is changed between a gripping state for gripping the brush, which has been inserted into the internal passage from an opening on a base end side and of which a part protrudes from an opening on a distal end side, to restrict the brush from moving in the axial direction, and a releasing state for releasing gripping of the brush to allow the brush to move in the axial direction.

4 Claims, 6 Drawing Sheets

(58) Field of Classification Search
CPC ........ A46B 2200/00; A46B 2200/1066; A46B 2200/1073; A46B 2200/108; A46B 2200/1086; A46B 9/00; A46B 9/04; A46B 9/045; A46B 9/06; A46B 9/08; A46B 9/10; A46B 9/12; A46B 5/00; A46B 5/0016; A46B 5/0095; A46B 7/00; A46B 7/02; A46B 7/04; A46B 7/023; A46B 3/18; A46B 17/04; A61C 15/00; A61C 15/02; A61C 15/04; A61C 15/042; A61C 15/046; A61C 15/047; A61C 15/048
USPC ... 15/106, 167.1, 168, 169, 184, 191.1, 194, 15/202, 206; 132/321, 328; 401/93; 30/329–339
See application file for complete search history.

(56) References Cited

U.S. PATENT DOCUMENTS

| | | | | |
|---|---|---|---|---|
| 7,793,379 | B2 * | 9/2010 | Weiss | A46B 7/023 15/167.1 |
| 2008/0115799 | A1 * | 5/2008 | Weiss | A61C 15/043 132/328 |
| 2008/0202549 | A1 * | 8/2008 | Weiss | A46B 7/023 132/328 |
| 2016/0354187 | A1 * | 12/2016 | Zmiyiwsky | A46B 5/0095 |
| 2019/0151056 | A1 * | 5/2019 | Zmiyiwsky | A46B 5/0095 |

FOREIGN PATENT DOCUMENTS

| | | | |
|---|---|---|---|
| GB | 2 416 986 | A | 2/2006 |
| GB | 2416985 | A | 2/2006 |
| JP | S54-144964 | U | 10/1979 |
| JP | S56-063419 | U | 5/1981 |
| JP | S60-056330 | U | 4/1985 |
| JP | H01-500882 | A | 3/1989 |
| JP | H07-026378 | A | 1/1995 |
| JP | H07-223685 | A | 8/1995 |
| JP | H07-284504 | A | 10/1995 |
| JP | H08-056749 | A | 3/1996 |
| JP | 3073196 | U | 11/2000 |
| JP | 2009-183521 | A | 8/2009 |
| KR | 20120078858 | A * | 10/2012 |

OTHER PUBLICATIONS

Mar. 12, 2021 Office Action issued in Korean Patent Application No. 10-2020-7031256.
Jan. 18, 2021 Office Action issued in Tawainese Patent Application No. 109137516.
Jun. 2, 2020 Search Report issued in International Patent Application No. PCT/JP2020/016451.
Jun. 2, 2020 Written Opinion of the International Searching Authority issued in International Patent Application No. PCT/JP2020/016451.
May 26, 2020 Office Action issued in Japanese Patent Application No. 2020-524912.
Jul. 14, 2020 Office Action issued in Japanese Patent Application No. 2020-524912.
Aug. 4, 2020 Notice of Allowance issued in Japanese Patent Application No. 2020-524912.
May 8, 2021 Office Action issued in Chinese Patent Application No. 202080003479.8.

* cited by examiner

INTERDENTAL BRUSH

TECHNICAL FIELD

The present invention relates to an interdental brush for cleaning between adjacent teeth.

BACKGROUND ART

Conventionally, there has been known an interdental brush for cleaning between adjacent teeth. In the case of a general interdental brush, a brush is fixed to a distal end of a shaft, and when a core of the brush is broken due to metal fatigue, the interdental brush is discarded. Accordingly, the conventional interdental brush has a problem that baggage becomes bulky at the time of traveling or the like, in addition to a problem of large waste of resources.

In order to solve the problems described above, Patent Literatures 1 to 4 disclose an interdental brush which includes holders for holding brushes and a cylindrical body for accommodating the holders arranged in series. In the case of the conventional interdental brush formed as above, after cleaning between teeth by one of the brushes exposed from a distal end of the cylindrical body, the cylindrical body can be reused by taking out the deteriorated brush together with the holder to expose another one of the brushes held by the next holder from the distal end of the cylindrical body.

CITATION LIST

Patent Literature

Patent Literature 1: JP-A-H08-56749
Patent Literature 2: JP-A-H07-223685
Patent Literature 3: JP-A-H07-284504
Patent Literature 4: JP-U-H07-26378

SUMMARY OF INVENTION

Technical Problem

However, in the interdental brush disclosed in Patent Literatures 1 to 4, since the holder is disposable, a problem of waste of resources cannot be solved. In addition, since it is necessary to accommodate a plurality of holders in the cylindrical body, there arises a new problem that the size of the interdental brush is increased.

The present invention has been made to solve the problems in the prior art, and an object thereof is to provide an interdental brush realizing reuse of parts by a simple structure.

Solution to Problem

In order to solve the problems described above, the present invention provides an interdental brush comprising: a shaft portion including an internal passage which extends in an axial direction and of which distal end and base end are opened; and a brush on which fibers are implanted over an entire area of a core that is longer than extension length of the internal passage; wherein the shaft portion further includes a grip portion of which a state is changed between a gripping state for gripping the brush, which has been inserted into the internal passage from an opening on a base end side and of which a part protrudes from an opening on a distal end side, to restrict the brush from moving in the axial direction, and a releasing state for releasing gripping of the brush to allow the brush to move in the axial direction.

Advantageous Effects of Invention

According to the present invention, it is possible to obtain an interdental brush realizing reuse of parts by a simple structure.

DESCRIPTION OF EMBODIMENTS

Hereinafter, an interdental brush 1 according to a first embodiment will be described with reference to the drawings. It should be noted that the embodiments of the present invention described below shows an example in which the present invention is embodied, but does not limit the scope of the present invention to the scope of the description of the embodiments. Accordingly, the present invention may be implemented by adding various modifications to the embodiments.

First Embodiment

Figure 1:
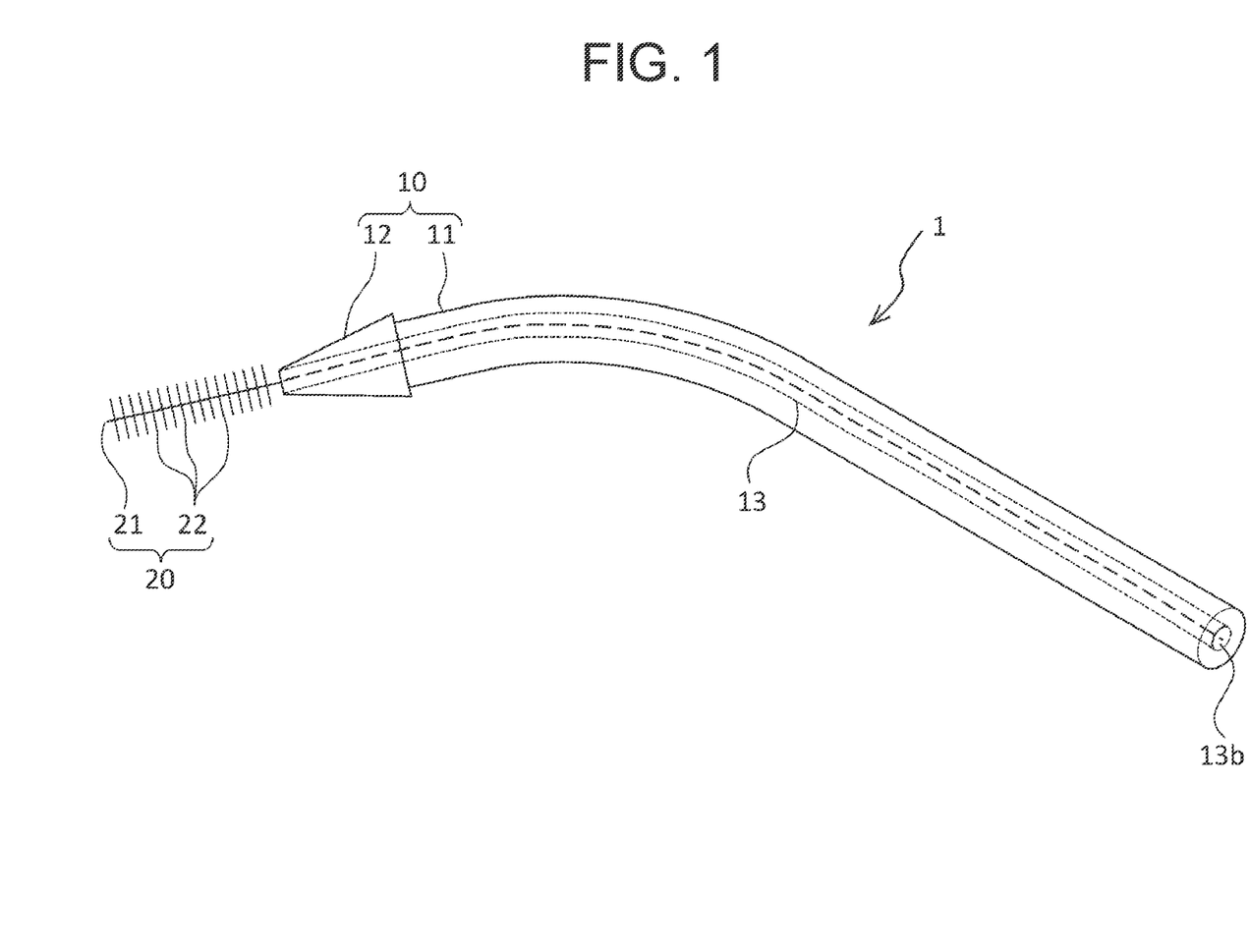
FIG. 1 is an overall view of an interdental brush according to a first embodiment.
Figure 2:
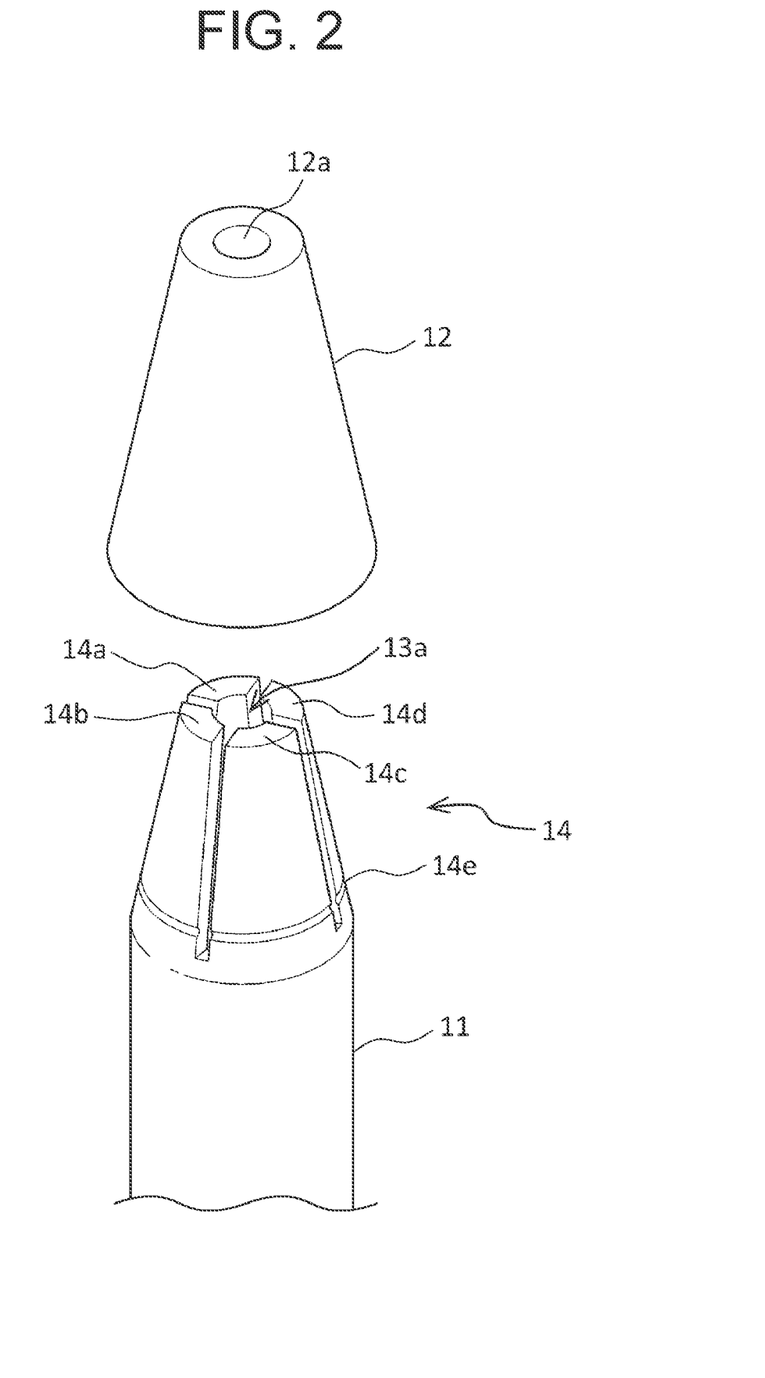
FIG. 2 is an exploded perspective view of a distal end of a shaft body and a cap as seen from the front.
Figure 3:
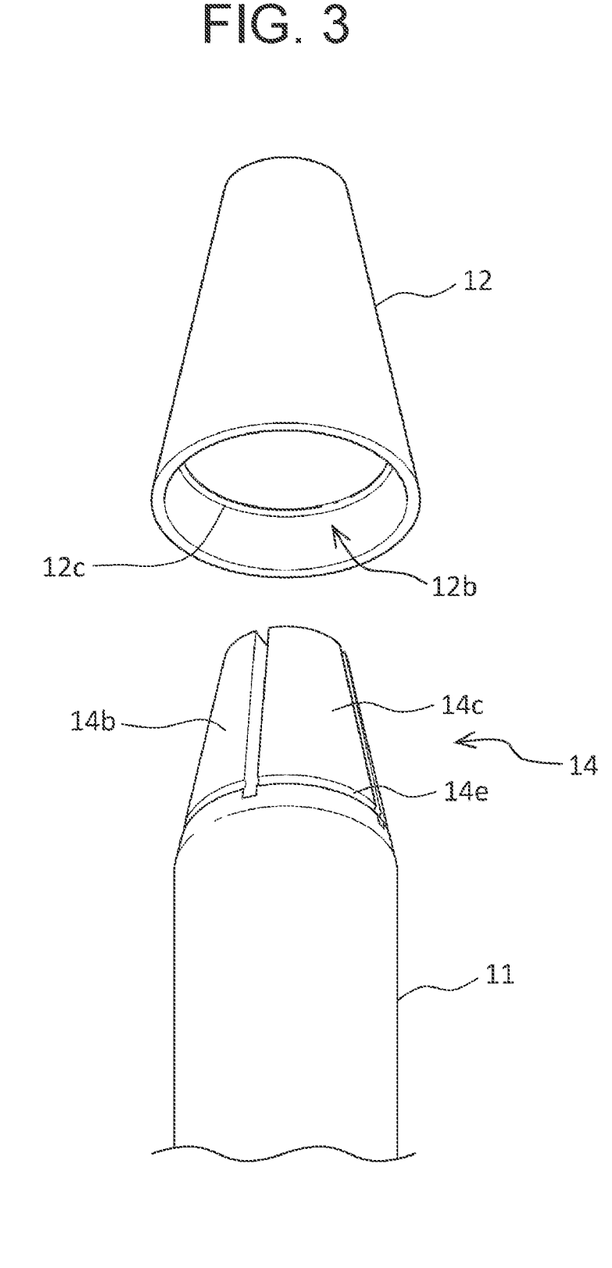
FIG. 3 is an exploded perspective view of a distal end of a shaft body and a cap as seen from the rear.
Figure 4A:
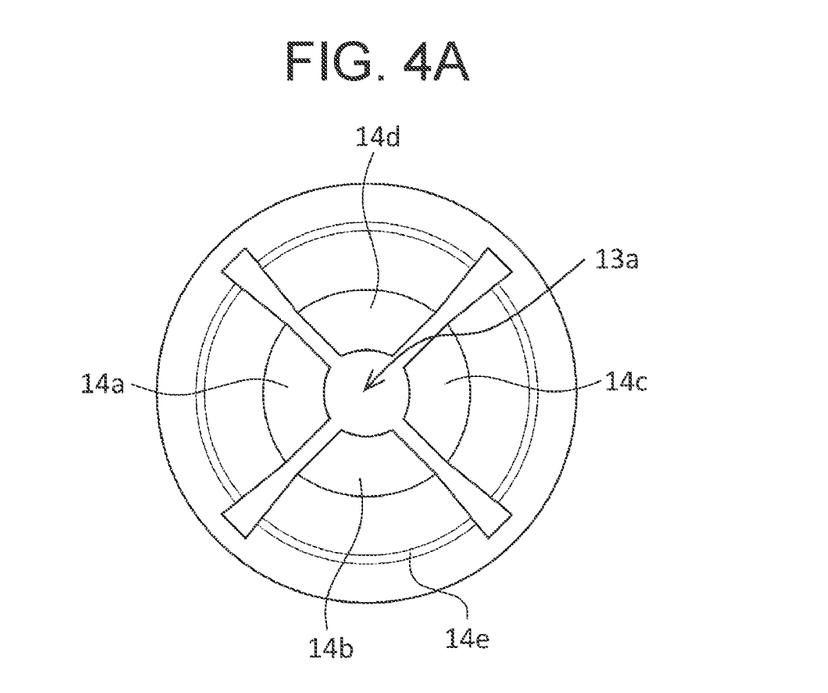
FIG. 4A illustrates a grip portion in a gripping state.
Figure 4B:
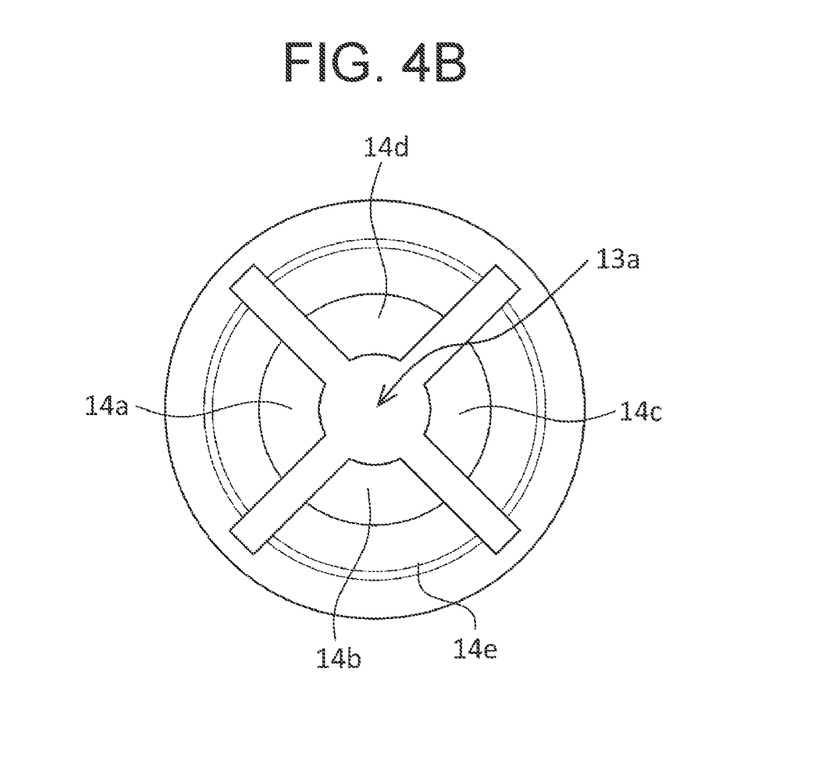
FIG. 4B illustrates a grip portion in a releasing state.
Figure 5:
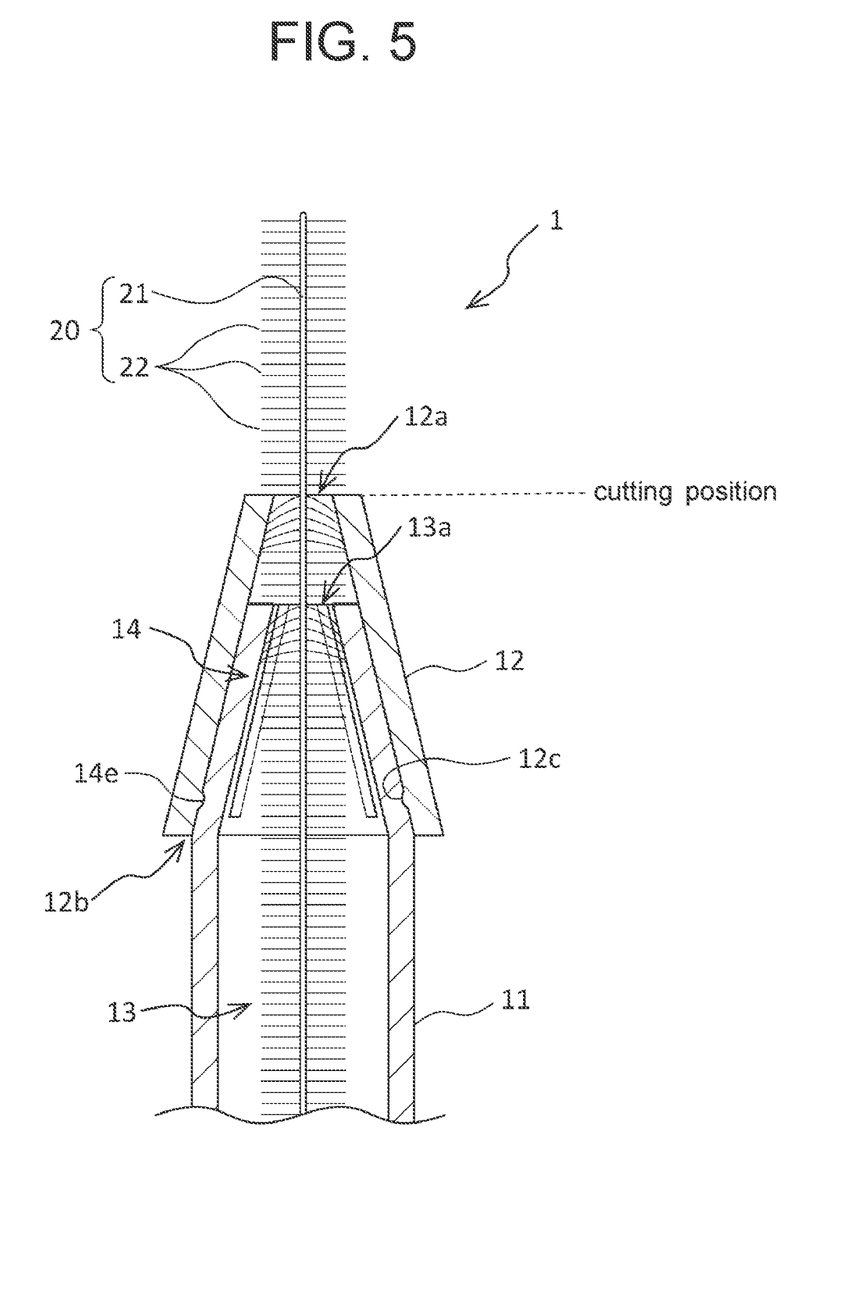
FIG. 5 is a cross-sectional view of a distal end of an interdental brush.

FIG. 1 is an overall view of an interdental brush 1 according to the first embodiment. FIG. 2 is an exploded perspective view of a distal end of a shaft body 11 and a cap 12 as seen from the front. FIG. 3 is an exploded perspective view of the distal end of the shaft body 11 and the cap 12 as seen from the rear. FIG. 4A illustrates a grip portion 14 in a gripping state. FIG. 4B illustrates the grip portion 14 in a releasing state. FIG. 5 is a cross-sectional view of the distal end of the interdental brush 1.

The interdental brush 1 cleans between teeth by inserting a brush 20 protruding from a shaft portion 10 between adjacent the teeth. As illustrated in FIGS. 1 to 5, the interdental brush 1 mainly includes the shaft portion 10 and the brush 20.

The shaft portion 10 functions as a handle to be gripped by a user of the interdental brush 1, and also has a function of accommodating the brush 20 to hold the same. As illustrated in FIG. 1, the shaft portion 10 includes the shaft body 11 and the cap 12.

The shaft body 11 is formed into an elongated rod-like shape. FIG. 1 illustrates the shaft body 11 with its distal end being curved, meanwhile, the shaft body 11 may has a straight shape. The shaft body 11 is provided with an internal passage 13 formed inside thereof. As illustrated in FIG. 1 and FIG. 2, the internal passage 13 is exposed to the outside at a distal end opening 13a formed on the distal end of the shaft body 11 and a base end opening 13b formed on a base end of the shaft body 11. The internal passage 13 is a space extending along an extending direction (axial direction) of the shaft body 11 between the distal end opening 13*a* and the base end opening 13*b*.

Furthermore, as illustrated in FIG. 2 and FIG. 3, the distal end portion of the shaft body 11 is provided with the grip portion 14. The grip portion 14 has a function to grip the brush 20 inserted into the internal passage 13 so as to restrict the brush 20 from moving within the internal passage 13 in the axial direction. The grip portion 14 has a tapered shape in which the diameter is gradually reduced toward the distal end of the shaft body 11. The grip portion 14 is formed by a plurality of claws 14*a*, 14*b*, 14*c*, 14*d*. Furthermore, the grip portion 14 is provided with a circumferential groove 14*e* extending in a circumferential direction.

The plurality of claws 14*a* to 14*d* is formed on the distal end of the shaft body 11 in the circumferential direction thereof, having predetermined intervals therebetween. In other words, the adjacent claws 14*a* to 14*d* are spaced in the circumferential direction by slits extending in the axial direction of the shaft body 11. A circle passing through distal ends of each of the claws 14*a* to 14*d* serves as the distal end opening 13*a*. In other words, the claws 14*a* to 14*d* are formed so as to surround the distal end opening 13*a*.

The claws 14*a* to 14*d* are formed to be elastically deformable in a radial direction of the shaft body 11. When the claws 14*a* to 14*d* are elastically deformed inwardly in the radial direction of the shaft body 11, spaces (i.e., slits) between the adjacent claws 14*a* to 14*d* are narrowed. As a result, as illustrated in FIG. 4A, the diameter of the distal end opening 13*a* is reduced. On the other hand, when the claws 14*a* to 14*d* are elastically restored outwardly in the radial direction of the shaft body 11, the spaces (i.e., slits) between the adjacent claws 14*a* to 14*d* are widened. As a result, as illustrated in FIG. 4B, the diameter of the distal end opening 13*a* is increased.

As illustrated in FIG. 2 and FIG. 3, the cap 12 is formed into a truncated shape. The cap 12 includes a small-diameter side opening 12*a* formed on an end face at a small-diameter side, and a large-diameter side opening 12*b* formed on an end face at a large-diameter side.

Furthermore, an inner peripheral surface of the cap 12 is provided with a circumferential protrusion 12*c* which is continuous in a circumferential direction. The cap 12 is attached to and detached from the distal end of the shaft body 11, thereby expanding and contracting the distal end opening 13*a*.

Specifically, when the cap 12 is attached to the distal end of the shaft body 11 from the side of the large-diameter side opening 12*b*, the claws 14*a* to 14*d* are pressed against the inner peripheral surface of the cap 12 and then elastically deformed inwardly in the radial direction, which reduces the diameter of the distal end opening 13*a*. Then, the circumferential protrusion 12*c* is fitted into the circumferential groove 14*e*, and accordingly, the cap 12 is fixed to the shaft body 11. On the other hand, when the cap 12 is detached from the distal end of the shaft body 11, the claws 14*a* to 14*d* which have been pressed by the cap 12 is released and thus elastically restored outwardly in the radial direction, which increases the diameter of the distal end opening 13*a*.

The brush 20 is inserted between the adjacent teeth to scrape out dirt between the teeth. The brush 20 is formed by a linear core 21 having flexibility and fibers 22 implanted on the entire of the core 21 in a longitudinal direction thereof. The unused core 21 is longer than the extension length of the internal passage 13. The core 21 is formed of, for example, metal. The fibers 22 are formed of, for example, nylon or saturated polyester resin. The fibers 22 extend in a direction crossing an extending direction of the core 21.

The brush 20 is inserted into the internal passage 13 from the base end opening 13*b*, and pushed into a position where a part of the brush 20 protrudes from the distal end opening 13*a*. In a state where the cap 12 is detached from the shaft body 11, the claws 14*a* to 14*d* do not grip the brush 20. Accordingly, the brush 20 is allowed to move in the axial direction within the internal passage 13. In this way, the state of the grip portion 14 which releases the gripping of the brush 20 to allow it to move in the axial direction is an example of a releasing state.

On the other hand, in a state where the cap 12 is attached to the shaft body 11, the claws 14*a* to 14*d* grip the brush 20. Accordingly, the brush 20 is restricted from moving in the axial direction within the internal passage 13. In this way, the state of the grip portion 14 which grips the brush 20 to restrict it from moving in the axial direction is an example of a gripping state. That is, the grip portion 14 is formed so that the state thereof can be changed between the releasing state and the gripping state by attachment or detachment of the cap 12 with respect to the shaft body 11.

Furthermore, as illustrated in FIG. 5, when the cap 12 is attached to the shaft body 11, a part of the brush 20 protruding from the distal end opening 13*a* passes through the small-diameter side opening 12*a* and then further protrudes to the outside of the shaft portion 10. The user grips the shaft portion 10 and inserts the brush 20 protruding from the small-diameter side opening 12*a* between the teeth, thereby cleaning spaces between the teeth.

Furthermore, when the cap 12 is attached to the shaft body 11, a gap is formed between the small-diameter side opening 12*a* and the distal end opening 13*a*. That is, among the brush 20 protruding from the distal end opening 13*a* to the outside of the shaft body 11, a part of a base end side thereof is located between the small-diameter side opening 12*a* and the distal end opening 13*a*, and does not protrude to the outside of the shaft portion 10 through the small-diameter side opening 12*a*.

As being repeatedly used, due to metal fatigue of the core 21, the brush 20 is broken at a position of an end face of the cap 12 at a small-diameter side (cutting position in FIG. 5). Next, when the cap 12 is detached from the shaft body 11, a part of the brush 20 protrudes to the outside of the shaft body 11 through the distal end opening 13*a*. Then, the part of the brush 20 is gripped to pull out the brush 20 by a predetermined amount. When the cap 12 is attached thereto again, an unused part of the brush 20 passes through the small-diameter side opening 12*a* and protrudes to the outside of the shaft portion 10. That is, in accordance with the procedure described above, the user of the interdental brush 1 can refresh the brush 20 protruding from the shaft portion 10.

According to the first embodiment, for example, the following operations and effects can be achieved.

According to the first embodiment, when the brush 20 is broken due to metal fatigue during use of the interdental brush 1, the user can continue to clean between the teeth with an unused part of the brush 20 by pulling the brush 20 out from the internal passage 13. At this time, the deteriorated part of the brush 20 is discarded, however, the shaft body 11 and the cap 12 can be reused. In this connection, it should be noted that the present invention is not limited to the case where the brush 20 is naturally broken. The operations and effects described above can be obtained when the user cuts the brush 20 at the cutting position at a timing when the fibers 22 are deteriorated.

That is, the interdental brush 1 illustrated in FIG. 1 corresponds to several conventional interdental brushes. Even in the case of frequently using the interdental brush 1, since the shaft portion 10 can be reused when preparing a spare brush 20, it is possible to reduce the baggage during travel or the like. As a result, it is possible to obtain the interdental brush 1 realizing reuse of parts by a simple structure.

Furthermore, according to the first embodiment, the state of the grip portion 14 can be changed by attachment or detachment of the cap 12 with respect to the shaft body 11. Thus, it is possible to prevent the brush 20 from being embedded in the shaft portion 10 during use of the interdental brush 1 while reducing resistance when pulling out the brush 20 from the shaft body 11. In addition, since the brush 20 is pulled out in a state where the distal end opening 13a is widened, it is possible to prevent the fibers 22 from being deteriorated when the fibers 22 pass through the distal end opening 13a.

Still further, according to the first embodiment, the gap is formed between the small-diameter side opening 12a and the distal end opening 13a, and thus even after the brush 20 is broken at the cutting position illustrated in FIG. 5, a state where a part of the brush 20 protrudes from the shaft body 11 can be maintained. As a result, an operation of pulling the brush 20 out from the shaft body 11 can be easily performed.

The specific structure for attaching the cap 12 to the shaft body 11 is not limited to a case for fitting the circumferential protrusion 12c to the circumferential groove 14e. Another example is to provide a spiral protrusion on an outer peripheral surface of the grip portion 14 and a spiral groove on an inner peripheral surface of the cap 12. The cap 12 is screwed into the grip portion 14 so that the spiral protrusion is inserted into the spiral groove, thereby attaching the cap 12 to the shaft body 11.

By adjusting an amount of screwing the cap 12, it is possible to properly grip the brush 20 having the core 21 which varies in diameter (e.g., 0.5 mm to 1.8 mm). Furthermore, even without completely detaching the cap 12 from the shaft body 11, only by loosening the cap 12 (reducing the amount of screwing), it is possible to change the gripping state of the grip portion 14 to the releasing state. In this connection, it is desirable to provide a non-slip material on an outer surface of the cap 12 so as to prevent the hand from slipping when screwing the cap 12 to the grip portion 14.

Second Embodiment

Figure 6A:
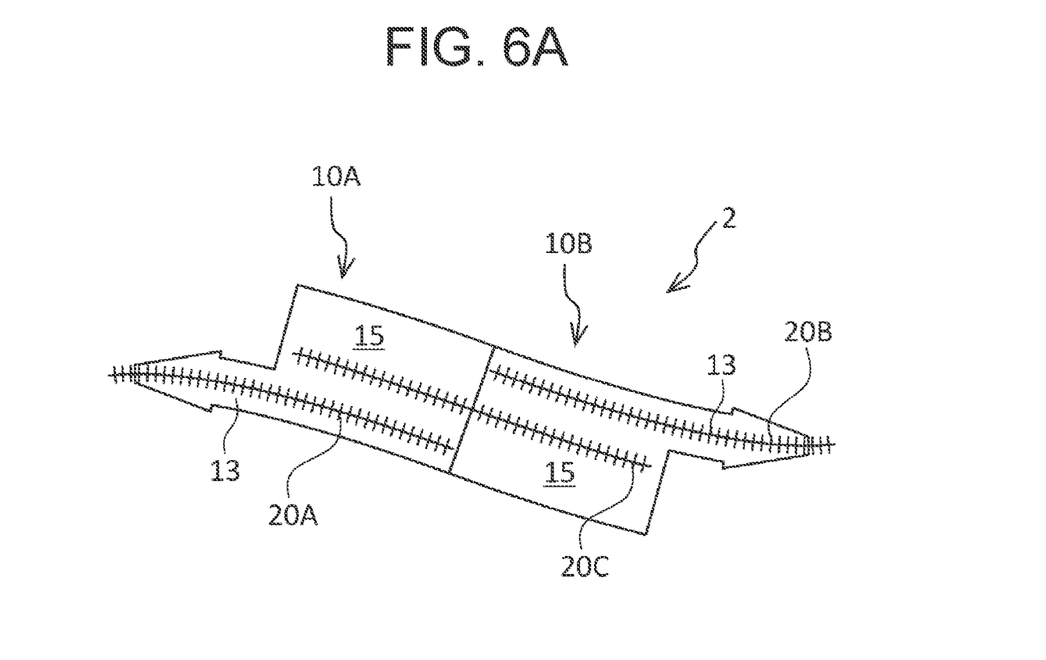
FIG. 6A is an assembly view of an interdental brush according to a second embodiment.
Figure 6B:
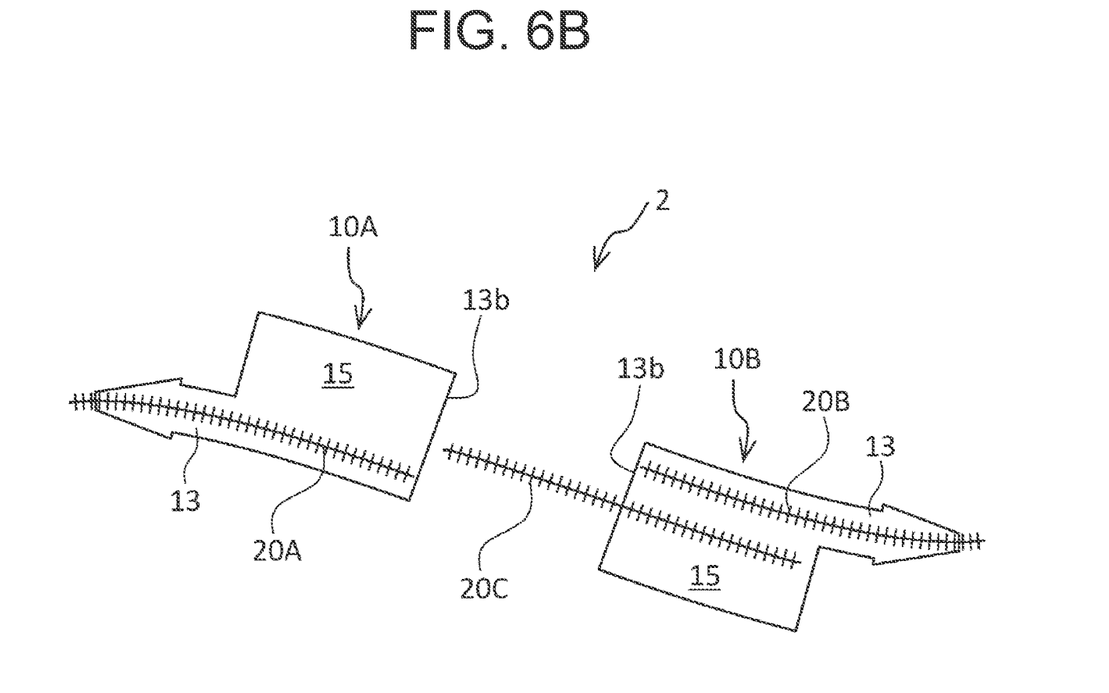
FIG. 6B is an exploded view of an interdental brush according to the second embodiment.

FIG. 6A is an assembly view of an interdental brush 2 according to a second embodiment. FIG. 6B is an exploded view of the interdental brush 2 according to the second embodiment. In the following, the points different from the first embodiment will be focused on while the points common to the first embodiment will be omitted to be explained. The interdental brush 2 according to the second embodiment differs from the interdental brush 1 according to the first embodiment in that a pair of shaft portions 10A, 10B is provided and that each of the shaft portions 10A, 10B is provided with a housing portion 15.

As illustrated in FIG. 6A and FIG. 6B, the interdental brush 2 according to the second embodiment includes the pair of shaft portions 10A, 10B. Each of the shaft portions 10A, 10B is different from the shaft portion 10 in that each of them is provided with the housing portion 15 while the other parts thereof are common to those of the shaft portion 10.

The housing portion 15 is an internal space of each of the shaft portions 10A, 10B communicating with the internal passage 13. The housing portion 15 can accommodate a plurality of brushes 20A, 20B, 20C. More specifically, the housing portion 15 is formed to be able to accommodate a spare brush 20C, which is different from the brushes 20A, 20B gripped by the grip portion 14, through the base end opening 13b. The structures of the brushes 20A, 20B, 20C are the same as that of the brush 20.

The number of the brushes 20 that can be accommodated in the housing portion 15 is not limited to the examples illustrated in FIG. 6A and FIG. 6B, and for example, may be four or more. The user may carry the interdental brush 2 in which, for example, a plurality of different types (e.g., different in hardness of the fibers 22, density of the fibers 22, etc.) of the brushes 20 are accommodated in the housing portion 15.

The pair of shaft portions 10A, 10B is formed so that the base end openings 13b thereof are detachable from each other. That is, as illustrated in FIG. 6A, when the base end openings 13b of the shaft portions 10A, 10B are fitted to each other, the housing portions 15 are closed to each other. On the other hand, as illustrated in FIG. 6B, when the shaft portions 10A, 10B are separated from each other, the base end openings 13b thereof are exposed so that the brushes 20A, 20B, 20C can be pulled out from the housing portion 15.

According to the second embodiment, in addition to the operations and effects by the first embodiment, the following operations and effects can be further obtained.

According to the second embodiment, since the spare brush 20C can be accommodated in the housing portion 15 in addition to the brushes 20A, 20B gripped by the grip portion 14, there is no trouble in an accommodation location of the spare brush 20C during a long travel or the like.

In the second embodiment, the example in which the housing portion 15 is closed by attaching the pair of shaft portions 10A, 10B to each other has been described, meanwhile, a specific method of closing the housing portion 15 is not limited to the example above.

REFERENCE SIGNS LIST 1, 2 interdental brush
10, 10A, 10B shaft portion
11 shaft body
12 cap
12a small-diameter side opening
12b large-diameter side opening
12c circumferential protrusion
13 internal passage
13a distal end opening
13b base end opening
14 grip portion
14a, 14b, 14c, 14d claw
14e circumferential groove
15 housing portion
20, 20A, 20B, 20C brush
21 core
22 fibers

The invention claimed is:
1. An interdental brush comprising:
 a pair of shaft portions, each of the pair of shaft portions including an internal passage which extends in an axial direction and of which distal end and base end are opened; and a plurality of brushes, each of the plurality of brushes including fibers implanted over an entire area of a core; wherein each of the pair of shaft portions includes:
- a grip portion of which a state is changed between a gripping state for gripping at least one of the brushes, which has been inserted into the internal passage from an opening on a base end side and of which a part protrudes from an opening on a distal end side, to restrict the at least one of the brushes from moving in the axial direction, and a releasing state for releasing gripping of the at least one of the brushes to allow the at least one of the brushes to move in the axial direction;
- a cap attached to a distal end side of the shaft portion so as to change the state of the grip portion; and
- a housing portion capable of accommodating a spare brush, which is different from the at least one of the brushes held by the grip portion, through the opening on the base end side, the pair of shaft portions is formed so that openings on base end sides thereof are directly detachable from each other, and a length of the spare brush is longer than an extension length of the housing portion of one of the pair of shaft portions while being shorter than a total length of each housing portion of both of the pair of shaft portions.

2. The interdental brush according to claim 1, wherein each of the pair of shaft portions further includes:
- a shaft body which is provided with the internal passage and the grip portion; and,
- the grip portion is formed by a plurality of claws provided at predetermined intervals in a circumferential direction so as to surround the opening on the distal end side,
- when the cap is attached thereto, each of the intervals between the plurality of claws is narrowed to bring the grip portion into the gripping state, and
- when the cap is detached therefrom, each of the intervals between the plurality of claws is widened to bring the grip portion into the releasing state.

3. The interdental brush according to claim 2, wherein the cap is formed into a truncated shape of which end faces on a small-diameter side and a large-diameter side are opened, and
- when the cap is attached to the distal end of the shaft body from an opening on the large-diameter side, a gap is formed between the opening on the distal end side of the shaft body and an opening on the small-diameter side of the cap, and the at least one of the brushes protruding from the opening on the distal end side of the shaft body further protrudes from the opening on the small-diameter side of the cap.

4. An interdental brush comprising:
- a pair of shaft portions, each of the pair of shaft portions including an internal passage which extends in an axial direction and of which distal end and base end are opened; and
- a plurality of brushes, each of the plurality of brushes including fibers implanted over an entire area of a core that is longer than extension length of the internal passage;

wherein each of the pair of shaft portions includes:
- a grip portion of which a state is changed between a gripping state for gripping at least one of the brushes, which has been inserted into the internal passage from an opening on a base end side and of which a part protrudes from an opening on a distal end side, to restrict the at least one of the brushes from moving in the axial direction, and a releasing state for releasing gripping of the at least one of the brushes to allow the at least one of the brushes to move in the axial direction;
- a housing portion capable of accommodating a spare brush, which is different from the at least one of the brushes held by the grip portion, through the opening on the base end side, and the pair of shaft portions is formed so that openings on base end sides thereof are detachable from each other,
- a shaft body which is provided with the internal passage and the grip portion; and
- a cap which is provided with one of a spiral groove and a spiral protrusion on an inner peripheral surface thereof, the grip portion includes:
- a plurality of claws provided at predetermined intervals in a circumferential direction so as to surround the opening on the distal end side; and
- the other one of the spiral groove and the spiral protrusion on outer peripheral surfaces of the plurality of claws, when the cap is screwed into the grip portion so that the spiral protrusion is inserted into the spiral groove, each of the intervals between the plurality of claws is narrowed to bring the grip portion into the gripping state, and when an amount of screwing the cap with respect to the shaft body is reduced, each of the intervals between the plurality of claws is widened to bring the grip portion into the releasing state.

* * * * *